3,795,703
PROCESS FOR PREPARING UNSATURATED
CARBOXYLIC ACIDS
Akihiko Niina, Kiyomori Oura, and Kuniyoshi Tashiro, Takaoka, Japan, assignors to Nippon Zeon Co., Ltd., Tokyo, Japan
No Drawing. Filed Nov. 28, 1972, Ser. No. 309,962
Claims priority, application Japan, Nov. 30, 1971, 46/95,949, 46/95,950; Dec. 16, 1971, 46/102,054; Dec. 27, 1971, 47/3,268
Int. Cl. C07c 57/04, 51/26; B01j 11/82
U.S. Cl. 260—530 N  6 Claims

ABSTRACT OF THE DISCLOSURE

A process for the preparation of an unsaturated carboxylic acid which comprises reacting an unsaturated aldehyde with molecular oxygen at an elevated temperature in the vapor phase, in the presence of an oxidation catalyst represented by the following empirical formula $$Mo_aP_bQ_cR_dO_e$$

wherein Q is at least one element selected from the group consisting of Tl, Rb, Cs and K; and R is at least one element selected from the group consisting of Cr, Si, Al, Ge and Ti; and $a$, $b$, $c$, $d$ and $e$ each represent the number of atoms of each element; the atomic ratio of $a:b:c:d$ is $1:1-0.01:1-0.01:2-0.01$; and $e$ is the number of oxygen atoms determined by the valence requirements of the other elements present.

---

This invention relates to a process for preparing unsaturated carboxylic acids by the vapor phase oxidation of unsaturated aldehydes using a specified catalyst which can give the unsaturated carboxylic acids in high selectivities and yields and has a long active lifetime.

The prior patents relating to the vapor phase catalytic oxidation of unsaturated aldehydes are directed chiefly to the production of acrylic acid from acrolein, and very few relate to the production of methacrylic acid from methacrolein.

Oxidation of methacrolein using the catalysts heretofore found effective in the oxidation of acrolein results, in almost all cases, in serious drawbacks such as the occurrence of side-reactions (for example, combustion reaction of methacrolein), extremely low conversion and yield or the very short active lifetime of the catalysts. On the other hand, the catalysts considered usable in the oxidation of methacrolein cannot be employed commercially in a longtime continuous operation since they give poor results or even when good results are obtained in the early stage of the reaction, they have a short active lifetime.

Usually, calcination treatment is performed in the preparation of oxidation reaction catalysts in order to increase the activity of the catalysts, finally stabilize the catalysts (prevent the reduction in yield and selectivity which may be caused by the change of the active state of the catalyst with the passage of the reaction time), and to prolong the active lifetime of the catalysts. However, the conventional catalysts have the following drawbacks in the calcination treatment.

(i) If the calcination treatment is carried out at a temperature which is the same as or lower than the reaction temperature, the resulting catalyst may give some fair results in the early stage of the reaction but the results become increasingly poor with the passage of time. Thus, the catalyst has the defect of short active lifetime.

(ii) Conversely, if the calcination treatment is carried out at a temperature higher than the reaction temperature in an attempt to stabilize the catalyst and prolong its active lifetime, the reaction results become poor.

Under the circumstances, it has been considered very difficult to produce methacrylic acid commercially by the oxidation of methacrolein, in spite of the fact that the production of acrylic acid from acrolein has been carried out commercially. Accordingly, it has been concluded that the development of catalysts useful for oxidation of methacrolein must be studied from a different point of view from the catalysts for oxidation of acrolein.

It is an object of this invention to provide a process for preparing methacrylic acid advantageously by oxidation of methacrolein using a new catalyst which has removed the defects of the conventional oxidation catalysts for methacrolein, and has excellent catalytic activity (namely, giving high yield and selectivity of methacrylic acid) and a long active lifetime.

Another object of this invention is to provide a process for preparing unsaturated carboxylic acids advantageously, using a new catalyst which is effective not only for oxidation of methacrolein but also for oxidation of other unsaturated aldehydes such as acrolein.

These objects of this invention can be achieved by using an oxidation catalyst represented by the following empirical formula $$Mo_aP_bQ_cR_dO_e$$

wherein Q is at least one element selected from the group consisting of Tl, Rb, Cs and K; R is at least one element selected from the group consisting of Cr, Si, Al, Ge and Ti; and $a$, $b$, $c$, $d$ and $e$ each represent a desirable number of atoms of each element; the preferred atomic ratio of $a:b:c:d$ is $1:1-0.01:1-0.01:2-0.01$; $e$ is the number of oxygen atoms determined by the valence requirements of the other elements present; and the more preferred atomic ratio of $a:b:c:d$ is $1:0.5-0.02:0.5-0.02:1-0.02$.

The catalyst used in this invention can give unsaturated carboxylic acids in higher yields and selectivities than the conventional catalysts by the stable oxidation reaction of unsaturated aldehydes under feasible reaction conditions. Furthermore, the problem of the active lifetime of catalyst has now been solved by the new catalyst used in this invention. Since the catalytic life can be maintained at a high level for prolonged periods of time, the reaction can be performed continuously over a long time.

Generally, the conventional catalysts require delicate preparation conditions and troublesome procedures, which leaves some question as to their reproducibility. However, the catalyst of this invention can be prepared by a simple procedure which always assures the good activity of the catalyst.

The method of preparing the catalyst used does not affect the present invention. The catalyst may be made, for example, by the oxide mixing method, the evaporative drying method or the coprecipitation method which are all known in the art. The starting constituent elements of the catalyst do not always have to be in the form of oxide but may be in the form of a metal, metal salt, acid or base so long as they can be converted to the corresponding metal oxides by calcination. Examples are the salts such as ammonium salts, nitrate of halides, the free acids such as molybdic acid or phosphoric acid, the isopolyacids such as pyrophosphoric acid, polyphosphoric acid or heptamolybdic acid, the salts of isopolyacids such as ammonium salt of an isopolyacid, the heteropolyacids such as phosphomolybdic acid, silicomolybdic acid, aluminomolybdic acid, germanomolybdic acid, chromium-molybdic acid, titanomolybdic acid, phosphochromium-molybdic acid or phosphotitanomolybdic acid, or the salts of heteropolyacids such as an ammonium salt of a heteropolyacid. Prior to use, the catalyst composition is preferably calcined for several hours to fifteen or sixteen hours at 250–700° C., preferably 350–600° C. in air, a reducing atmosphere or feed gas.

The catalyst can be prepared, for example, by mixing an aqueous solution containing a water-soluble compound of the R element with an aqueous solution containing ammonium molybdate, adding an aqueous solution containing phosphoric acid and an aqueous solution containing a nitrate of the Q element such as thallium nitrate, evaporatively drying the mixture with stirring, calcining the solid obtained, pulverizing the calcined product, and then molding it into pellets. Other examples of the catalyst preparation are described, for example, in the working examples to be given later. It is preferred that the catalyst be prepared so that the constituent elements will form complex compounds such as heteropolyacids, their acid salts or ammonium salts. Those skilled in the art can select the desired method of preparing the catalyst. It is not clear in what state the individual elements of the catalyst composition including oxygen are during the reaction when the catalyst is exhibiting its catalytic action.

While the catalyst can be used in the molded or powdered form, it is also possible to use it after dilution with an inert diluent. If desired, the catalyst can be deposited on a suitable inert carrier material. Examples of the carrier are $\alpha$-alumina, silicon carbide, graphite, inert titania, zirconium oxide, thorium chloride, pumice, silica gel, or celite. The amount of the diluent or carrier is suitably chosen since it has no essential effect on the activity of the catalyst.

The unsaturated aldehyde may preferably be acrolein or methacrolein. The source of molecular oxygen can be pure oxygen or air. Furthermore, it is possible to introduce into the reaction zone an inert diluent gas such as steam, nitrogen, argon, carbon dioxide, helium or a saturated hydrocarbon, for example, methane, ethane, propane or pentane.

The concentration of the unsaturated aldehyde in the feed gas to be introduced into the reactor is preferably 1 to 25% by volume. On the other hand, the molar ratio of the starting unsaturated aldehyde to molecular oxygen is conveniently 1:(0.1–25.0), preferably 1:(0.02–20.0). The reaction temperature is usually 270 to 450° C., preferably 300 to 420° C., and the reaction pressure can be from a reduced pressure of less than atmospheric pressure to a superatmospheric pressure up to 15 atms. Preferably, the reaction pressure is 1 to 5 atmospheres. The contact time (on the basis of 0° C. and 1 atm.) is from 0.01 to 20 seconds, preferably 0.1 to 15 seconds. These conditions are suitably determined relatively to each other in accordance with the catalyst employed and the reaction conditions. The type of the reactor may be any of those which are conventional such as the fluidized, moving or fixed bed type. The reaction product can be recovered by known techniques, for example, the method of condensation and liquefaction by means of a condenser or the method of extraction by water or a suitable solvent.

The invention is illustrated by the following examples. The conversion of the unsaturated aldehyde, the yield of the unsaturated carboxylic acid and the selectivity therefor are defined below. The analysis was carried out by the gas chromatographic method in all cases.

Conversion (%)

$$= \frac{\text{unsaturated aldehyde} - \text{unreacted unsaturated}}{\text{unsaturated aldehyde fed (mol)}} \times 100$$

Yield (%)

$$= \frac{\text{unsaturated carboxylic acid formed (mol)}}{\text{unsaturated aldehyde fed (mol)}} \times 100$$

$$\text{Selectivity (\%)} = \frac{\text{Yield}}{\text{conversion}} \times 100$$

The abbreviations used in the tables appearing in the examples have the following meanings:

Cat.=catalyst
CT=temperature at which the catalyst composition is calcined
RT=reaction temperature
AL=acrolein
MAL=methacrolein
AA=acrylic acid
MAA=methacrylic acid
Conv.=conversion
Sel.=selectivity Furthermore, in the following indication of the composition of the catalyst, the presence of oxygen is not specifically mentioned.

EXAMPLE 1

237 g. of phosphomolybdic acid were dissolved in 300 ml. of water with heating, and an aqueous solution of 20 g. of chromic anhydride dissolved in 100 ml. of water was added to the solution. The mixture was stirred, and an aqueous solution of 11.5 g. of 85% phosphoric acid in 100 ml. of water and an aqueous solution obtained by dissolving 53.2 g. of thallium nitrate in 200 ml. of water with heating were further added. Then, 100 ml. of 28% aqueous ammonia were added to this mixture, and the entire mixture was evaporated to dryness with stirring. The solid obtained was calcined at 400° C. for 16 hours in a muffle furnace, pulverized, and molded into pellets each having a size of 5 mm. x 5 mm. diameter. The atomic ratio of Mo:P:Tl:Cr of the resulting catalyst composition (Cat. No. a–1) was 1:0.16:0.16:0.16. In the same way, Cat. No. a–2 and a–3 were prepared by changing the calcination temperature to 450° C. and 500° C. respectively.

Similarly, Cat. No. a–4 to Cat. No. a–7 were prepared. Cat. No. a–6 was prepared by further adding ammonium molybdate in the preparation of Cat. No. a–1 above.

Further, using rubidium nitrate, cesium nitrate and potassium nitrate instead of the thallium nitrate, Cat. No. 8 to Ca. No. 21 were prepared.

As comparisons, catalyst (Cat. No. X–1 to X–9) were prepared at the calcination temperature of 450° C. in the same way as mentioned above.

A stainless steel reaction tube 2.5 cm. in inside diameter and 60 cm. in length was packed with 100 ml. of the catalyst, and heated by a molten metal bath. A feed gas having a methacrolein: $O_2$:$N_2$:$H_2O$ molar ratio of

1:1.5:17.5:10 was passed through the reaction tube while the contact time was adjusted to 3.6 seconds (on the basic of 0° C., and 1 atm.). The results obtained are shown in Table 1.

It is seen from the results shown in Table 1 that the catalysts of the present invention do not deteriorate even if the calcining temperature is high, and give markedly superior results at low reaction temperatures as compared with the comparison catalysts.

TABLE 1

| Run No. | Cat. No. | Catalyst composition | CT (°C.) | RT (°C.) | MAL conv., percent | MAA, percent Yield | MAA, percent Sel. |
|---|---|---|---|---|---|---|---|
| *This invention* | | | | | | | |
| I-1 | a-1 | $Mo_1P_{0.16}Tl_{0.16}Cr_{0.16}$ | 400 | 345 | 80.3 | 58.6 | 73.0 |
| I-2 | a-2 | $Mo_1P_{0.16}Tl_{0.16}Cr_{0.16}$ | 450 | 348 | 80.7 | 60.0 | 74.4 |
| I-3 | a-3 | $Mo_1P_{0.16}Tl_{0.16}Cr_{0.16}$ | 500 | 355 | 79.3 | 60.1 | 75.8 |
| I-4 | a-4 | $Mo_1P_{0.08}Tl_{0.16}Cr_{0.08}$ | 450 | 350 | 79.3 | 59.1 | 74.5 |
| I-5 | a-5 | $Mo_1P_{0.16}Tl_{0.25}Cr_{0.5}$ | 450 | 345 | 81.0 | 59.0 | 72.8 |
| I-6 | a-6 | $Mo_1P_{0.05}Tl_{0.10}Cr_{0.05}$ | 450 | 363 | 69.4 | 46.5 | 67.0 |
| I-7 | a-7 | $Mo_1P_{0.30}Tl_{0.16}Cr_{0.16}$ | 450 | 365 | 69.3 | 47.1 | 68.0 |
| I-8 | a-8 | $Mo_1P_{0.16}Rb_{0.16}Cr_{0.16}$ | 400 | 348 | 74.6 | 49.8 | 66.8 |
| I-9 | a-9 | $Mo_1P_{0.16}Rb_{0.16}Cr_{0.16}$ | 450 | 351 | 78.4 | 55.0 | 70.2 |
| I-10 | a-10 | $Mo_1P_{0.16}Rb_{0.16}Cr_{0.16}$ | 500 | 361 | 76.1 | 55.2 | 72.5 |
| I-11 | a-11 | $Mo_1P_{0.08}Rb_{0.16}Cr_{0.08}$ | 450 | 350 | 76.5 | 54.3 | 71.0 |
| I-12 | a-12 | $Mo_1P_{0.16}Rb_{0.25}Cr_{0.5}$ | 450 | 351 | 78.2 | 54.0 | 69.1 |
| I-13 | a-13 | $Mo_1P_{0.16}Tl_{0.08}Rb_{0.08}Cr_{0.16}$ | 450 | 355 | 77.3 | 56.3 | 72.9 |
| I-14 | a-14 | $Mo_1P_{0.16}Cs_{0.16}Cr_{0.16}$ | 400 | 343 | 81.3 | 60.2 | 76.3 |
| I-15 | a-15 | $Mo_1P_{0.16}Cs_{0.16}Cr_{0.16}$ | 450 | 347 | 82.0 | 65.0 | 79.3 |
| I-16 | a-16 | $Mo_1P_{0.16}Cs_{0.16}Cr_{0.16}$ | 500 | 356 | 81.0 | 65.2 | 80.5 |
| I-17 | a-17 | $Mo_1P_{0.16}Cs_{0.16}Cr_{0.08}$ | 450 | 350 | 78.5 | 57.6 | 73.4 |
| I-18 | a-18 | $Mo_1P_{0.16}Rb_{0.08}Cs_{0.08}Cr_{0.08}$ | 450 | 357 | 76.9 | 57.0 | 74.2 |
| I-19 | a-19 | $Mo_1P_{0.16}K_{0.16}Cr_{0.16}$ | 400 | 345 | 74.0 | 50.4 | 68.1 |
| I-20 | a-20 | $Mo_1P_{0.16}K_{0.16}Cr_{0.16}$ | 450 | 350 | 72.5 | 52.7 | 72.7 |
| I-21 | a-21 | $Mo_1P_{0.16}K_{0.16}Cr_{0.16}$ | 500 | 354 | 70.4 | 51.5 | 73.2 |
| *Comparison* | | | | | | | |
| I-22 | x-1 | $Mo_1P_{0.16}Cr_{0.16}$ | 450 | 382 | 46.7 | 20.3 | 43.5 |
| I-23 | x-2 | $Mo_1P_{0.16}Tl_{0.16}$ | 450 | 385 | 49.4 | 30.6 | 61.9 |
| I-24 | x-3 | $Mo_1P_{0.16}Rb_{0.16}$ | 450 | 385 | 47.8 | 27.8 | 58.2 |
| I-25 | x-4 | $Mo_1P_{0.16}Cs_{0.16}$ | 450 | 375 | 50.5 | 30.4 | 60.2 |
| I-26 | x-5 | $Mo_1P_{0.16}K_{0.16}$ | 450 | 389 | 45.2 | 21.0 | 46.5 |
| I-27 | x-6 | $Mo_1Tl_{0.16}Cr_{0.16}$ | 450 | 385 | 35.6 | 7.8 | 21.9 |
| I-28 | x-7 | $Mo_1Rb_{0.16}Cr_{0.16}$ | 450 | 384 | 36.0 | 6.4 | 17.8 |
| I-29 | x-8 | $Mo_1Cs_{0.16}Cr_{0.16}$ | 450 | 383 | 37.5 | 9.5 | 25.3 |
| I-30 | x-9 | $Mo_1K_{0.16}Cr_{0.16}$ | 450 | 390 | 35.6 | 6.6 | 18.5 |

EXAMPLE 2

237 g. of phosphomolybdic acid were dissolved in 400 ml. of water with heating, and an aqueous solution obtained by adding 17.0 g. of silicon tetrachloride in 200 ml. of cold water dropwise was added to the solution. The mixture was heated, and further an aqueous solution obtained by dissolving 53.2 g. of thallium nitrate in 200 ml. of water with heating was added. To the resulting mixture 50 ml. of 28% aqueous ammonia were added, and the entire mixture was evaporated to dryness with stirring. The solid obtained was calcined at 400° C. for 5 hours in a muffle furnace, pulverized, and molded into pellets each having a size of 5 mm. x 5 mm. diameter. The atomic ratio of Mo:P:Tl:Si of the catalyst composition (Cat. No. b-1) obtained was 1:0.08:0.16:0.08. In the same way Cat. No. b-2 and Cat No. b-3 were prepared by changing the calcination temperature to 450° C. and 500° C. respectively.

Similarly, Cat. No. b-4 was prepared.

Furthermore, Cat. No. b-5 to Cat. No. b-13 were prepared by using rubidium nitrate, cesium nitrate and potassium nitrate instead of the thallium nitrate. Cat. No. b-8 was prepared by adding 11.5 g. of 85% phosphoric acid further.

As comparisons, Cat. No. Y-1 to Cat. No. Y-6 were prepared at the calcination temperature of 450° C.

Using each of the catalyst compositions, methacrolein was oxidized under the same conditions as in Example 1. The results obtained are shown in Table 2.

TABLE 2

| Run No. | Cat. No. | Catalyst composition | CT (°C) | RT (°C) | MAL conv., percent | MAA, percent Yield | MAA, percent Sel. |
|---|---|---|---|---|---|---|---|
| *This invention* | | | | | | | |
| II-1 | b-1 | $Mo_1P_{0.08}Tl_{0.16}Si_{0.08}$ | 400 | 346 | 77.5 | 56.6 | 73.0 |
| II-2 | b-2 | $Mo_1P_{0.08}Tl_{0.16}Si_{0.08}$ | 450 | 351 | 76.7 | 58.2 | 75.8 |
| II-3 | b-3 | $Mo_1P_{0.08}Tl_{0.16}Si_{0.08}$ | 500 | 370 | 60.8 | 43.1 | 70.9 |
| II-4 | b-4 | $Mo_1P_{0.08}Tl_{0.08}Si_{0.08}$ | 450 | 376 | 61.3 | 41.2 | 67.2 |
| II-5 | b-5 | $Mo_1P_{0.08}Rb_{0.16}Si_{0.08}$ | 400 | 348 | 75.0 | 52.5 | 70.0 |
| II-6 | b-6 | $Mo_1P_{0.08}Rb_{0.16}Si_{0.08}$ | 450 | 352 | 77.3 | 56.3 | 72.8 |
| II-7 | b-7 | $Mo_1P_{0.08}Rb_{0.16}Si_{0.08}$ | 500 | 374 | 61.2 | 40.2 | 65.7 |
| II-8 | b-8 | $Mo_1P_{0.16}Rb_{0.16}Si_{0.08}$ | 450 | 352 | 70.9 | 48.6 | 68.7 |
| II-9 | b-9 | $Mo_1P_{0.01}Cs_{0.16}Si_{0.08}$ | 400 | 347 | 79.3 | 57.0 | 71.9 |
| II-10 | b-10 | $Mo_1P_{0.08}Cs_{0.16}Si_{0.08}$ | 450 | 351 | 78.8 | 59.3 | 75.3 |
| II-11 | b-11 | $Mo_1P_{0.08}Cs_{0.16}Si_{0.08}$ | 500 | 368 | 70.1 | 54.6 | 77.9 |
| II-12 | b-12 | $Mo_1P_{0.08}Rb_{0.08}Cs_{0.08}Si_{0.04}$ | 450 | 362 | 71.0 | 49.1 | 69.3 |
| II-13 | b-13 | $Mo_1P_{0.08}K_{0.16}Si_{0.08}$ | 450 | 360 | 62.3 | 43.6 | 70.0 |
| *Comparison* | | | | | | | |
| II-14 | Y-1 | $Mo_1P_{0.08}Si_{0.08}$ | 450 | 383 | 42.4 | 16.3 | 38.4 |
| II-15 | Y-2 | $Mo_1P_{0.15}Si_{0.08}$ | 450 | 390 | 39.5 | 15.4 | 39.0 |
| II-16 | Y-3 | $Mo_1Tl_{0.16}Si_{0.08}$ | 450 | 375 | 41.7 | 11.5 | 27.6 |
| II-17 | Y-4 | $Mo_1Rb_{0.16}Si_{0.08}$ | 450 | 380 | 40.1 | 10.1 | 25.2 |
| II-18 | Y-5 | $Mo_1Cs_{0.16}Si_{0.08}$ | 450 | 380 | 40.1 | 11.6 | 28.9 |
| II-19 | Y-6 | $Mo_1K_{0.16}Si_{0.08}$ | 450 | 391 | 38.5 | 7.0 | 18.2 |

EXAMPLE 3

(1) 237 g. of phosphomolybdic acid were dissolved in 300 ml. of water with heating, and an aqueous solution obtained by dissolving 75.0 g. of aluminum nitrate in 200 ml. of water was added. The mixture was stirred, and an aqueous solution of 34.5 g. of 85% phosphoric acid in 150 ml. of water and an aqueous solution obtained by dissolving 53.2 g. of thallium nitrate in 200 ml. of water were added. Furthermore, 100 ml. of 28% aqueous ammonia were added, and the entire mixture was evaporated to dryness with stirring. The solid obtained was calcined at 450° C. for 5 hours in a muffle furnace, pulverized, and molded into pellets each having a size of 5 mm. x 5 mm. diameter. The atomic ratio of Mo:P:Tl:Al in the catalyst composition obtained (Cat. No. c-1) was 1:0.33:0.16:0.16. Similarly, Cat. No. c-2 to Cat. No. c-4 were prepared by using rubidium nitrate, cesium nitrate and potassium nitrate instead of the thallium nitrate.

As comparisons, Cat. No. Z-1 to Cat. No. Z-4 were prepared.

(2) 212 g. of ammonium molybdate were dissolved in 400 ml. of water with heating. A suspension obtained by adding 21.4 g. of germanium tetrachloride to 200 ml.

of water was added. Further, an aqueous solution of 11.5 g. of 85% phosphoric acid in 100 ml. of water and an aqueous solution obtained by dissolving 53.2 g. of thallium nitrate in 200 ml. of water with heating were added, and the entire mixture was evaporated to dryness with stirring. The solid obtained was calcined at 450° C. for 5 hours in a muffle furnace, pulverized, and molded into pellets each having a size of 5 mm. x 5 mm. diameter. The atomic ratio of Mo:P: Tl:Ge in the catalyst composition obtained (Cat. No. c–5) was 1:0.08:0.16:0.08. Furthermore, Cat. No. c–6 to Cat. No. c–8 were prepared in the same way as above using rubidium nitrate, cesium nitrate, and potassium nitrate instead of the thallium nitrate.

As comparisons, Cat. No. Z–6 to Cat. No. Z–10 were prepared in the same way.

(3) 57.0 g. of titanium tetrachloride were hydrolyzed, and made alkaline with ammonia. The resulting precipitate was separated by filtration. The precipitate and 212 g. of ammonium molybdate were dissolved in 500 ml. of water with heating. An aqueous solution of 69.0 g. of 85% phosphoric acid in 200 ml. of water and an aqueous solution obtained by dissolving 79.8 g. of thallium nitrate in 200 ml. of water with heating were added, and the entire mixture was evaporated to dryness with stirring. The solid obtained was calcined at 450° C. for 16 hours in a muffle furnace, pulverized, and molded into pellets each having a size of 5 mm. x 5 mm. diameter. The atomic ratio of Mo:P:Tl:Ti in the resulting catalyst composition (Cat. No. c–9) was 1:0.5:0.25:0.25. Similarly, Cat. No. c–10 to Cat. No. c–12 were prepared by using rubidium nitrate, cesium nitrate and potassium nitrate instead of the thallium nitrate.

As comparisons, Cat. No. Z–11 to Cat. No. Z–15 were prepared in the same way as above.

Using each of the catalyst compositions obtained in (1) to (3) above, methacrolein was oxidized in the same way as in Example 1. The results obtained are given in Table 3.

position of the feed gas to acrolein: $O_2:N_2:H_2O = 1:2:8:9$ (molar ratio). The results are shown in Table 4.

TABLE 4

| Run No. | Cat. No. | Catalyst composition | RT (° C.) | AL conv., percent | AA, percent Yield | Sel. |
|---|---|---|---|---|---|---|
| IV-1 | a-2 | $Mo_1P_{0.16}Tl_{0.16}Cr_{0.16}$ | 350 | 87.4 | 75.7 | 86.6 |
| IV-2 | b-2 | $Mo_1P_{0.08}Tl_{0.16}Si_{0.08}$ | 355 | 88.3 | 75.2 | 85.2 |
| IV-3 | c-1 | $Mo_1P_{0.33}Tl_{0.16}Al_{0.16}$ | 360 | 86.3 | 74.5 | 86.3 |
| IV-4 | c-5 | $Mo_1P_{0.08}Tl_{0.16}Ge_{0.08}$ | 365 | 85.6 | 72.3 | 84.5 |
| IV-5 | c-9 | $Mo_1P_{0.5}Tl_{0.25}Ti_{0.25}$ | 366 | 82.7 | 71.0 | 85.9 |
| IV-6 | a-9 | $Mo_1P_{0.16}Rb_{0.16}Cr_{0.16}$ | 352 | 85.3 | 72.1 | 84.5 |
| IV-7 | b-6 | $Mo_1P_{0.08}Rb_{0.16}Si_{0.08}$ | 358 | 86.2 | 71.8 | 83.3 |
| IV-8 | c-2 | $Mo_1P_{0.33}Rb_{0.16}Al_{0.16}$ | 361 | 83.4 | 68.1 | 81.7 |
| IV-9 | c-6 | $Mo_1P_{0.08}Rb_{0.16}Ge_{0.08}$ | 364 | 86.1 | 70.8 | 82.2 |
| IV-10 | c-10 | $Mo_1P_{0.5}Rb_{0.25}Ti_{0.25}$ | 369 | 82.0 | 67.5 | 82.3 |
| IV-11 | a-15 | $Mo_1P_{0.16}Cs_{0.16}Cr_{0.16}$ | 350 | 90.3 | 82.0 | 90.8 |
| IV-12 | b-10 | $Mo_1P_{0.08}Cs_{0.16}Si_{0.08}$ | 354 | 89.7 | 78.5 | 87.5 |
| IV-13 | c-3 | $Mo_1P_{0.33}Cs_{0.16}Al_{0.16}$ | 362 | 86.1 | 73.6 | 85.5 |
| IV-14 | c-7 | $Mo_1P_{0.08}Cs_{0.16}Ge_{0.08}$ | 362 | 87.7 | 77.4 | 88.3 |
| IV-15 | c-11 | $Mo_1P_{0.5}Cs_{0.16}Ti_{0.25}$ | 365 | 84.0 | 71.4 | 85.0 |
| IV-16 | a-20 | $Mo_1P_{0.16}K_{0.16}Cr_{0.16}$ | 357 | 85.6 | 71.3 | 83.3 |
| IV-17 | b-13 | $Mo_1P_{0.08}K_{0.16}Si_{0.08}$ | 365 | 78.9 | 63.7 | 80.7 |
| IV-18 | c-4 | $Mo_1P_{0.33}K_{0.16}Al_{0.16}$ | 367 | 77.5 | 61.5 | 79.4 |
| IV-19 | c-8 | $Mo_1P_{0.08}K_{0.16}Ge_{0.08}$ | 362 | 85.4 | 73.4 | 85.9 |
| IV-20 | c-12 | $Mo_1P_{0.5}K_{0.16}Ti_{0.25}$ | 373 | 80.0 | 60.3 | 75.4 |

EXAMPLE 5

Methacrolein was oxidized continuously for prolonged periods of time under the same conditions as in Example 1 using each of the catalysts shown in Table 5 which were obtained in Examples 1, 2 and 3 at the calcination temperature of 450° C. The performance of each catalyst used after a lapse of 60 days of reaction is shown in Table 5.

As comparisons, catalysts which showed relatively good results when they had been calcined at the optimum calcination temperature were chosen from the comparison catalysts used in Examples 1, 2 and 3. Using each of the chosen catalysts, the longtime continuous reaction was performed in the same way. The performance of each of the comparison catalyst is shown in Table 5. In the table, "0" under "time elapsed" means the initial stage of the reaction.

It is seen from Table 5 that the catalysts of this in-

TABLE 3

| Run No. | Cat. No. | Catalyst composition | CT (° C.) | RT (° C.) | MAL conv., percent | MAA, percent Yield | Sel. |
|---|---|---|---|---|---|---|---|
| This invention | | | | | | | |
| III-1 | c-1 | $Mo_1P_{0.33}Tl_{0.16}Al_{0.16}$ | 450 | 353 | 72.3 | 52.1 | 72.1 |
| III-2 | c-2 | $Mo_1P_{0.33}Rb_{0.16}Al_{0.16}$ | 450 | 360 | 68.9 | 42.5 | 61.7 |
| III-3 | c-3 | $Mo_1P_{0.33}Cs_{0.16}Al_{0.16}$ | 450 | 360 | 69.5 | 49.5 | 71.2 |
| III-4 | c-4 | $Mo_1P_{0.33}K_{0.16}Al_{0.16}$ | 450 | 362 | 58.7 | 40.1 | 68.3 |
| III-5 | c-5 | $Mo_1P_{0.08}Tl_{0.16}Ge_{0.08}$ | 450 | 363 | 69.6 | 49.3 | 70.8 |
| III-6 | c-6 | $Mo_1P_{0.08}Rb_{0.16}Ge_{0.08}$ | 450 | 365 | 67.2 | 47.0 | 69.9 |
| III-7 | c-7 | $Mo_1P_{0.08}Cs_{0.16}Ge_{0.08}$ | 450 | 365 | 71.3 | 53.0 | 74.3 |
| III-8 | c-8 | $Mo_1P_{0.08}K_{0.16}Ge_{0.08}$ | 450 | 360 | 71.1 | 53.5 | 75.2 |
| III-9 | c-9 | $Mo_1P_{0.5}Tl_{0.25}Ti_{0.25}$ | 450 | 364 | 68.2 | 47.1 | 69.1 |
| III-10 | c-10 | $Mo_1P_{0.5}Rb_{0.25}Ti_{0.25}$ | 450 | 367 | 66.5 | 43.6 | 65.6 |
| III-11 | c-11 | $Mo_1P_{0.5}Cs_{0.16}Ti_{0.25}$ | 450 | 360 | 68.9 | 47.0 | 68.2 |
| III-12 | c-12 | $Mo_1P_{0.5}K_{0.16}Ti_{0.25}$ | 450 | 370 | 56.9 | 38.5 | 67.7 |
| III-13 | c-13 | $Mo_1P_{0.08}K_{0.08}Rb_{0.08}Ge_{0.04}$ | 450 | 368 | 65.2 | 44.1 | 67.7 |
| Comparison | | | | | | | |
| III-14 | Z-1 | $Mo_1P_{0.33}Al_{0.16}$ | 450 | 385 | 40.6 | 19.2 | 47.3 |
| III-15 | Z-2 | $Mo_1Tl_{0.16}Al_{0.16}$ | 450 | 380 | 36.7 | 8.2 | 22.3 |
| III-16 | Z-3 | $Mo_1Rb_{0.16}Al_{0.16}$ | 450 | 384 | 35.0 | 8.0 | 22.9 |
| III-17 | Z-4 | $Mo_1Cs_{0.16}Al_{0.16}$ | 450 | 383 | 37.6 | 8.4 | 22.3 |
| III-18 | Z-5 | $Mo_1K_{0.16}Al_{0.16}$ | 450 | 390 | 34.0 | 6.8 | 20.2 |
| III-19 | Z-6 | $Mo_1P_{0.08}Ge_{0.08}$ | 450 | 374 | 39.2 | 19.4 | 49.5 |
| III-20 | Z-7 | $Mo_1Tl_{0.16}Ge_{0.08}$ | 450 | 376 | 43.8 | 9.8 | 22.4 |
| III-21 | Z-8 | $Mo_1Rb_{0.16}Ge_{0.08}$ | 450 | 380 | 45.1 | 10.1 | 22.4 |
| III-22 | Z-9 | $Mo_1Cs_{0.16}Ge_{0.08}$ | 450 | 381 | 42.6 | 10.6 | 23.5 |
| III-23 | Z-10 | $Mo_1K_{0.16}Ge_{0.08}$ | 450 | 384 | 42.8 | 11.0 | 25.7 |
| III-24 | Z-11 | $Mo_1P_{0.5}Ti_{0.25}$ | 450 | 380 | 41.6 | 25.2 | 60.6 |
| III-25 | Z-12 | $Mo_1Tl_{0.25}Ti_{0.25}$ | 450 | 375 | 40.5 | 12.1 | 29.9 |
| III-26 | Z-13 | $Mo_1Rb_{0.25}Ti_{0.25}$ | 450 | 383 | 42.0 | 12.0 | 28.6 |
| III-27 | Z-14 | $Mo_1Cs_{0.16}Ti_{0.25}$ | 450 | 378 | 42.8 | 12.8 | 29.9 |
| III-28 | Z-15 | $Mo_1K_{0.16}Ti_{0.25}$ | 450 | 389 | 40.1 | 9.8 | 24.4 |

EXAMPLE 4

Acrolein was oxidized under the same conditions as in Example 1 using each of the catalysts shown in Table 4 which were prepared in Examples 1, 2 and 3 at the calcination temperature of 450° C. and adjusting the comvention do not lose activity even after a long lapse of time, and prove to be an excellent catalysts having a very long active life time. On the other hand, the activity of the comparison catalysts decreases abruptly within a short period of time, and therefore, they have a short active lifetime.

TABLE 5

| Run No. | Cat. No. | Catalyst composition | CT (°C) | Time elapsed (days) | RT (°C) | MAL conv., percent | MAA, percent Yield | Sel. |
|---|---|---|---|---|---|---|---|---|
| [This invention] | | | | | | | | |
| V-1 | a-2 | $Mo_1P_{0.16}Tl_{0.16}Cr_{0.16}$ | 450 | 0 | 348 | 80.7 | 60.0 | 74.4 |
| | | | | 60 | 350 | 81.4 | 59.2 | 72.7 |
| V-2 | b-2 | $Mo_1P_{0.08}Tl_{0.16}Si_{0.08}$ | 450 | 0 | 351 | 76.7 | 58.2 | 75.8 |
| | | | | 60 | 353 | 78.1 | 57.1 | 73.1 |
| V-3 | c-1 | $Mo_1P_{0.08}Tl_{0.16}Al_{0.16}$ | 450 | 0 | 353 | 72.3 | 52.1 | 72.1 |
| | | | | 60 | 358 | 71.4 | 52.0 | 72.8 |
| V-4 | c-5 | $Mo_1P_{0.08}Tl_{0.16}Ge_{0.08}$ | 450 | 0 | 363 | 69.5 | 49.6 | 71.4 |
| | | | | 60 | 367 | 67.8 | 48.3 | 71.2 |
| V-5 | c-9 | $Mo_1P_{0.5}Tl_{0.25}Ti_{0.25}$ | 450 | 0 | 364 | 68.3 | 47.6 | 69.7 |
| | | | | 60 | 368 | 69.0 | 47.0 | 68.1 |
| V-6 | a-9 | $Mo_1P_{0.16}Rb_{0.16}Cr_{0.16}$ | 450 | 0 | 350 | 78.4 | 55.0 | 70.2 |
| | | | | 60 | 354 | 78.5 | 54.8 | 69.8 |
| V-7 | b-6 | $Mo_1P_{0.08}Rb_{0.16}Si_{0.08}$ | 450 | 0 | 352 | 77.3 | 56.3 | 72.8 |
| | | | | 60 | 355 | 76.2 | 55.1 | 72.3 |
| V-8 | c-2 | $Mo_1P_{0.33}Rb_{0.16}Al_{0.16}$ | 450 | 0 | 360 | 68.9 | 42.5 | 61.7 |
| | | | | 60 | 365 | 69.2 | 41.6 | 60.1 |
| V-9 | c-6 | $Mo_1P_{0.08}Rb_{0.16}Ge_{0.08}$ | 450 | 0 | 365 | 67.2 | 47.0 | 69.9 |
| | | | | 60 | 369 | 65.8 | 46.1 | 70.5 |
| V-10 | c-10 | $Mo_1P_{0.5}Rb_{0.25}Ti_{0.25}$ | 450 | 0 | 367 | 66.5 | 43.6 | 65.6 |
| | | | | 60 | 372 | 68.1 | 44.1 | 64.8 |
| V-11 | a-15 | $Mo_1P_{0.16}Cs_{0.16}Cr_{0.16}$ | 450 | 0 | 347 | 82.0 | 65.0 | 79.3 |
| | | | | 60 | 350 | 83.0 | 64.8 | 78.1 |
| V-12 | b-10 | $Mo_1P_{0.08}Cs_{0.16}Si_{0.08}$ | 450 | 0 | 351 | 78.8 | 59.3 | 75.3 |
| | | | | 60 | 354 | 78.5 | 58.8 | 74.9 |
| V-13 | c-3 | $Mo_1P_{0.33}Cs_{0.16}Al_{0.16}$ | 450 | 0 | 340 | 69.5 | 49.5 | 71.2 |
| | | | | 60 | 363 | 68.2 | 48.0 | 70.4 |
| V-14 | c-7 | $Mo_1P_{0.08}Cs_{0.16}Ge_{0.08}$ | 450 | 0 | 356 | 71.3 | 53.0 | 74.3 |
| | | | | 60 | 360 | 70.5 | 51.7 | 73.3 |
| V-15 | c-11 | $Mo_1P_{0.5}Cs_{0.16}Ti_{0.25}$ | 450 | 0 | 360 | 68.9 | 47.0 | 68.2 |
| | | | | 60 | 364 | 69.1 | 45.9 | 66.4 |
| V-16 | a-20 | $Mo_1P_{0.16}K_{0.16}Cr_{0.16}$ | 450 | 0 | 350 | 72.5 | 52.7 | 72.7 |
| | | | | 60 | 353 | 75.1 | 52.2 | 71.4 |
| V-17 | b-13 | $Mo_1P_{0.08}K_{0.16}Si_{0.08}$ | 450 | 0 | 360 | 62.3 | 43.6 | 70.0 |
| | | | | 60 | 366 | 60.2 | 41.8 | 69.4 |
| V-18 | c-4 | $Mo_1P_{0.33}K_{0.16}Al_{0.16}$ | 450 | 0 | 362 | 58.7 | 40.1 | 68.3 |
| | | | | 60 | 368 | 57.2 | 38.7 | 67.7 |
| V-19 | c-8 | $Mo_1P_{0.08}K_{0.16}Ge_{0.08}$ | 450 | 0 | 360 | 71.1 | 53.5 | 75.2 |
| | | | | 60 | 365 | 70.8 | 52.8 | 74.6 |
| V-20 | c-12 | $Mo_1P_{0.5}K_{0.16}Ti_{0.25}$ | 450 | 0 | 370 | 56.9 | 38.5 | 67.7 |
| | | | | 60 | 375 | 55.7 | 37.1 | 66.6 |
| [Comparison] | | | | | | | | |
| V-21 | x'-1 | $Mo_1P_{0.16}Tl_{0.16}$ | 400 | 0 | 345 | 58.5 | 40.4 | 69.1 |
| | | | | 60 | 385 | 54.6 | 30.2 | 55.3 |
| V-22 | x'-2 | $Mo_1P_{0.16}Rb_{0.16}$ | 400 | 0 | 353 | 56.2 | 38.1 | 67.8 |
| | | | | 60 | 384 | 53.1 | 30.9 | 58.2 |
| V-23 | x'-3 | $Mo_1P_{0.16}Cs_{0.16}$ | 400 | 0 | 349 | 59.5 | 40.6 | 68.2 |
| | | | | 60 | 396 | 55.3 | 28.7 | 51.9 |
| V-24 | x'-4 | $Mo_1P_{0.16}K_{0.16}$ | 400 | 0 | 355 | 50.4 | 30.1 | 59.7 |
| | | | | 60 | 391 | 47.3 | 20.2 | 42.7 |
| V-25 | x'-5 | $Mo_1P_{0.16}Cr_{0.16}$ | 300 | 0 | 380 | 64.3 | 45.2 | 70.3 |
| | | | | 20 | 395 | 50.6 | 22.5 | 44.5 |
| V-26 | x'-6 | $Mo_1P_{0.08}Si_{0.08}$ | 350 | 0 | 360 | 63.0 | 35.3 | 56.0 |
| | | | | 30 | 398 | 58.2 | 21.5 | 36.9 |
| V-27 | x'-7 | $Mo_1P_{0.33}Al_{0.16}$ | 350 | 0 | 365 | 59.8 | 33.4 | 55.9 |
| | | | | 30 | 394 | 49.6 | 19.3 | 38.9 |
| V-28 | x'-8 | $Mo_1P_{0.08}Ge_{0.08}$ | 400 | 0 | 335 | 62.1 | 45.0 | 72.4 |
| | | | | 60 | 390 | 47.5 | 25.4 | 53.5 |
| V-29 | x'-9 | $Mo_1P_{0.5}Ti_{0.25}$ | 400 | 0 | 355 | 64.5 | 58.8 | 60.2 |
| | | | | 60 | 385 | 50.2 | 26.3 | 52.4 |

What is claimed is:

1. A process for the preparation of an unsaturated carboxylic acid which comprises reacting an unsaturated aldehyde selected from acrolein and methacrolein with molecular oxygen at an elevated temperature in the vapor phase, in the presence of an oxidation catalyst represented by the following empirical formula $$Mo_aP_bQ_cR_dO_e$$

wherein Q is at least one element selected from the group consisting of Tl, Rb, Cs and K; and R is at least one element selected from the group consisting of Cr, Si, Al, Ge and Ti; and $a$, $b$, $c$, $d$ and $e$ each represent the number of atoms of each element; the atomic ratio of $a:b:c:d$ is 1:1-0.01:1-0.01:2-0.01; and $e$ is the number of oxygen atoms determined by the valence requirements of the other elements present.

2. The process of claim 1, wherein the reaction temperature is 270–450° C.

3. The process of claim 1, wherein the source of molecular oxygen is air.

4. The process of claim 1, wherein an inert diluent gas is introduced into the reaction zone.

5. The process of claim 1, the catalyst is diluted with an inert diluent or supported on an inert carrier.

6. The process of claim 1, wherein the atomic ratio of $a:b:c:d$ is 1:0.5-0.02:0.5-0.02:1-0.02.

References Cited

UNITED STATES PATENTS

| 3,666,804 | 5/1972 | Parthasarathy et al. | 260—530 N |
| 3,703,548 | 11/1972 | Honda et al. | 260—530 N |

FOREIGN PATENTS

| 21,328 | 9/1965 | Japan | 260—530 N |
| 6,226 | 4/1966 | Japan | 260—530 N |
| 2,038,749 | 8/1970 | Japan | 260—530 N |
| 2,020,791 | 11/1970 | West Germany | 260—530 N |

LORRAINE A. WEINBERGER, Primary Examiner

R. D. KELLY, Assistant Examiner

U.S. Cl. X.R.

252—435